United States Patent
Glass et al.

(10) Patent No.: US 7,890,310 B2
(45) Date of Patent: Feb. 15, 2011

(54) METHOD FOR ANALYSIS OF CONTROL SYSTEMS

(75) Inventors: John Glass, Franklin, MA (US); Pascal Gahinet, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 853 days.

(21) Appl. No.: 10/991,899

(22) Filed: Nov. 17, 2004

(65) Prior Publication Data

US 2006/0112382 A1    May 25, 2006

(51) Int. Cl.
G06G 7/48    (2006.01)
(52) U.S. Cl. .......................................................... 703/6
(58) Field of Classification Search .................. 703/6, 703/22

See application file for complete search history.

(56) References Cited

U.S. PATENT DOCUMENTS 5,311,421 A * 5/1994 Nomura et al. ............... 700/37
6,285,972 B1 * 9/2001 Barber .......................... 703/8
6,330,483 B1 * 12/2001 Dailey ......................... 700/28

FOREIGN PATENT DOCUMENTS

WO    WO-2004/001575 A1    12/2003

OTHER PUBLICATIONS

Greg Wolodkin, Karen Gondoly, Pascal Gahine, Autopilot Design using Simulink and the Control System Toolbox, Newsletters—MATLAB Digest, Sep. 1998, http://www.mathworks.com/company/newsletters/digest/sept98/aircraft.html.*

Raja R. Kadiyala, "A Tool Box for Approximate Linearization of Nonlinear System", Apr. 1993, IEEE.*

RDM, "First Order System: Linearizing SYstem Equation", May 29, 2000, http://www.engin.umich.edu/group/ctm/working/mac/first_order/linearize/index.htm.*

Kobylarz et al.; Fuzzy Scheduling of Regional QFT Controllers; International Journal of Robust and Nonlinear Control, vol. 7, 661D674 (1997).*

National Instruments "LabVIEW, Control Design Toolkit User Manuel," Apr. 2004 Edition.

International Search Report for Application No. PCT/US2005/041694, dated Jul. 31, 2006.

Visual Solutions, "VisSim/Analyze, Version 4.5," User's Guide, Visual Solutions, Inc. (2000).

(Continued)

Primary Examiner—Hugh Jones
(74) Attorney, Agent, or Firm—Nelson Mullins Riley & Scarborough LLP; Kevin J. Canning; Neslihan I. Doran

(57) ABSTRACT

The present invention provides a framework to let users systematically analyze, and design controllers for, complex non-linear dynamic systems modeled in a block diagram environment. By extracting linearized models from non-linear plant models (block diagrams), users can use one or more control design and tuning methodologies available for linear systems. Complex side effects, such as cross-coupling and exogenous disturbances, are viewable and can be dealt with in real-time during a design. The results of a design are automatically implemented in a block diagram.

51 Claims, 12 Drawing Sheets

OTHER PUBLICATIONS

The MathWorks Inc., "Control Systems Toolbox, For Use With Mathlab, User's Guide, Version 4.2," (1999), pp. 1-649.

Kajiwara, Hiroyuki, "Progress of CACSD Tools," Journal of the Socity of Instrument and Control Engineers, vol. 33 (6): 457-462 (1997).

The MathWorks, "Simulink, Dynamic System Simulation for MATLAB, Using Simulink, Version 3," Japanese/English Manual, pp. 5-18 (1999).

Japanese Office Action for Application No. 2007-543240, dated Oct. 12, 2010.

\* cited by examiner

METHOD FOR ANALYSIS OF CONTROL SYSTEMS

RELATED APPLICATIONS

This application is related to a pending United States patent application entitled "Tool for Design of Multiple Single-Input-Single-Output Control Loops", filed on Jun. 15, 2004, Ser. No. 10/869,163, the contents of which are hereby incorporated by reference in their entirety.

FIELD OF THE INVENTION

The present invention relates to a method for analysis of control systems in a block diagram environment. Specifically, a linear model can be extracted to enable the use of design methodologies to design and tune control systems.

BACKGROUND OF THE INVENTION

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), biochemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Dynamic systems are typically modeled in simulation environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems.

A schematic representation of such an interconnection that has evolved over the years is the graphical model. Such graphical models have now become a standard means in textbooks, design papers, journal articles, and specifications to communicate the details of a dynamic system's behavior. Various classes of graphical models describe computations that can be performed on computational hardware, such as a computer, microcontroller, FPGA, and custom hardware. Classes of such graphical models include time-based block diagrams, such as those found within SIMULINK from The Math Works, Inc. of Natick, Mass., state-based and flow diagrams, such as those found within STATEFLOW from The Math Works, Inc. of Natick, Mass., data-flow diagrams, circuit diagrams, and software diagrams, such as those found in the Unified Modeling Language. A common characteristic among these various forms of graphical models is that they define semantics on how to execute the model.

Generally, graphical analysis and simulation methods, such as the block diagram method, are used in modeling for design, analysis, and synthesis of engineered systems. The visual representation allows for a convenient interpretation of model components and structure and provides a quick intuitive notion of system behavior. Block diagrams are a set of graphical connections between blocks to model a system. The individual blocks in a block diagram represent mathematical operations and output a result.

Conventional simulation models become more complex as models are developed that model more complex systems. Hundreds of thousands of blocks that represent primitive and aggregate mathematical operations may be present. To manage the complexity of such models, principles of partitioning, abstraction, and hierarchy are applied.

In addition to graphical based modeling or simulation, other applications can be utilized to model a system, such as a control system or dynamic system. For example, MATLAB provided by The Math Works, Inc. of Natick, Mass., is an interactive programming and interpretive application that can implement a variety of computing tasks in engineering and science, while also having the ability to execute other executable programs. Some of the tasks that MATLAB can perform range from data acquisition and analysis to application development. The MATLAB environment integrates mathematical computing, visualization, and technical programming language. MATLAB includes built-in interfaces that provide access and import data from instruments, files, and external databases and programs.

In addition, MATLAB can integrate external routines written in C, C++, Fortran, and Java with MATLAB applications. As such, MATLAB provides an example of interactive programming and interpretive environments that can work in conjunction with C routines provided external to MATLAB including those provided by third party providers.

Control systems, specifically feedback control systems, can be designed and modeled based on conventional graphical model methodology. For example, FIG. 1 illustrates a basic controller sequence modeled using a graphical model format. There is a reference "u" provided to a controller 500 that controls an operation in a plant 502. A "plant" refers to a physical subsystem or process being controlled. This results in an output of the plant "y", which is both output and communicated back to a Sum operation 504 for input to the controller 500. The control system is the interconnection between the controller and a plant.

However, in real world applications a model of a plant and corresponding controller(s) is far more complex. Most control systems are MIMO (multi-input multi-output) in nature. FIG. 2 is an illustration of a model of plant operations, and the various controllers and variables that may be encountered in a simulation. A nonlinear plant 510 has a first controller 512, a second controller 514, up to "n" controllers 516. There are multiple inputs to the first, second, and n controllers 512, 514, and 516 in the form of a first reference 518, a second reference 520, operating points 522, a first disturbance 524, and a second disturbance 526. The controllers 512, 514, and 516 control the plant 510 and produce a first output 528 and a second output 530. The behavior of the control system is dependent upon multiple inputs, complex operating points, multiple control elements, and multiple output signals. This desired behavior is expressed in many different ways by engineers as "performance constraints". These "performance constraints" are usually based on characteristics of the output and internal signals of the control system under normal operating conditions when the system is subject to changes in reference and disturbance signals. In addition there may be requirements or "design specifications" that the dynamics of the control system meet certain stability specifications such as gain and phase margins. The design specifications are defined to be based on some combination of the controllers and the plant of the control system. For example, the stability margins of a control system can be based on the frequency response of a interconnection between controller and the plant. There are a plurality of controllers, feedback loops, or compensators, that must be designed and subsequently tuned in complex control systems. In such a situation, engineers typically design control systems and portions of control systems without taking into account dynamics that result from a change in inputs across the entire plant 510 or changes to other portions of the control system. The focus of a control system design is to transform the performance constraints and design specifications required of the feedback control system to the analysis used in control design.

SUMMARY OF THE INVENTION

There is a need for an ability to analyze the behavior a controller within a control system to enable the controller to be designed or tuned. There is a further need for a graphical environment for interactively tuning design parameters and receiving feedback on how the tuning process effects a larger control system or dynamic system model. The present invention is directed toward further solutions to address these needs.

In accordance with one aspect of the present invention, in an electronic device, a method includes the step of providing a graphical view of a block diagram model which includes a control system. The method also selects a subset of blocks representative of a controller for a plant from the block diagram model. The method further includes the step of programmatically extracting a linear model from the block diagram relative to the controller. The method also programmatically imports the linear model into a design tool.

In another embodiment of the invention a method includes the steps of selecting a block representative of a controller in a block diagram model. The method also selects a first signal relating to the controller. The method further specifies a performance constraint of the first signal or a design specification for the dynamics of the controller. A linear model of the block diagram model relative to the signal is also extracted programmatically. The method additionally programmatically maps the performance constraint for the first signal or the design specification for the dynamics of the controller, to a design tool.

In an embodiment in an electronic device, a method includes the step of providing a graphical view of a block diagram model which includes a control system. The method also selects a subset of blocks representative of a controller for a plant from the block diagram model. The method further includes the step of programmatically extracting a linear model from the block diagram relative to the controller. The method also programmatically updates the block diagram model by importing at least one characteristic of the controller into the block diagram model.

In a different embodiment in an electronic device, a method includes the step of providing a graphical view of a block diagram model which includes a control system. The method also selects a subset of blocks representative of a controller for a plant from the block diagram model. A performance constraint for a first signal relating to the controller or a design specification for the dynamics of the controller are also specified by the method. The method further includes the step of programmatically extracting a linear model from the block diagram relative to the controller. The method also programmatically updates the block diagram model by importing at least one characteristic of the controller into the block diagram model and importing the linear model into a design tool.

BRIEF DESCRIPTION OF THE DRAWINGS

The present invention will become better understood with reference to the following description and accompanying drawings, wherein.

DETAILED DESCRIPTION

Figure 1:
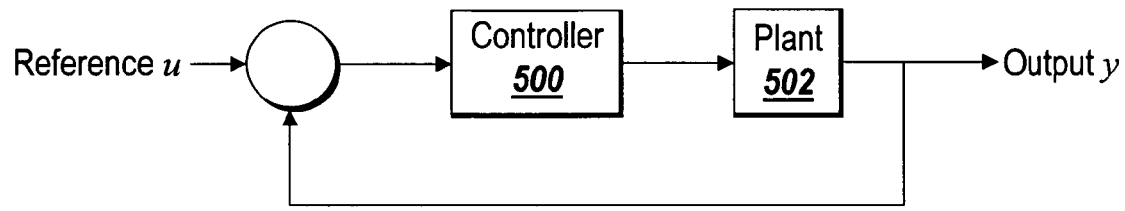
FIG. 1 is a diagrammatic illustration of an example conventional graphical model representation of a control system.
Figure 2:
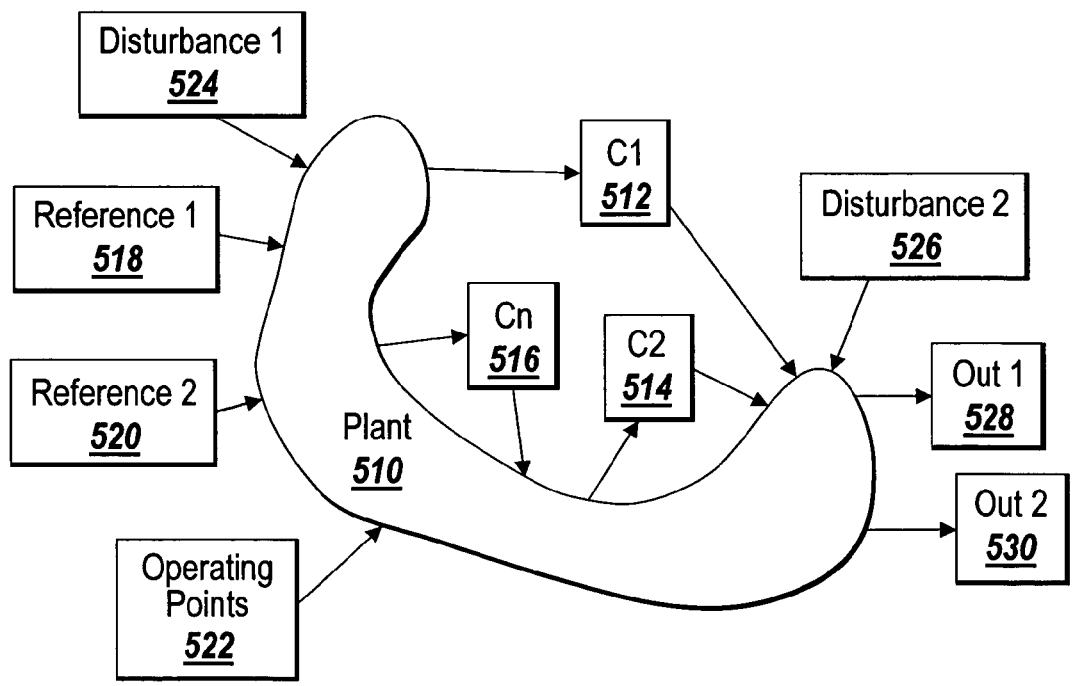
FIG. 2 is a diagrammatic illustration of an example complex control system.

The design of control systems using full non-linear/hybrid models can be mathematically intractable given the complexity of many industrial high fidelity models. A common approach to the analysis of these complex models is to develop an approximation to the non-linear behavior through a process known as linearization. The illustrative embodiment of the present invention provides a framework to let users systematically analyze, and design controllers for, complex non-linear dynamic systems modeled in a simulation based block diagram environment. The elements controllers refer to gains or dynamic systems whose structure and parameterizations are the subject of the design of the control system. In graphical block diagram languages, controllers refer to individual elements or elements grouped in individual subsystems or sub-models. By systematically extracting linearized models from non-linear plant models (block diagrams), users can leverage the vast array of control design and tuning methodologies available for linear systems.

The present invention can provide a link between non-linear modeling in graphical environments and the development of controllers for linearizations of these models around user-specified operating points. The invention automatically imports linearizations into an existing GUI that has highly developed analysis and design procedures. The present invention also allows for users to mark relevant signals for specifying and assessing the performance of the control system. These signals include reference, disturbance, feedback, and measured outputs. The marking of the signals allows for complex side effects, such as cross-coupling and exogenous disturbances, to be viewable and can be handled in real-time during a design. In addition to marking signals, users also may specify constraints on the dynamics of the system.

This generalized model structure can be used for batch simulation, gain scheduling, and Monte Carlo techniques. Also, the user can move back and forth seamlessly between the linear and non-linear models. The ability to switch between linear and non-linear models allows for the rapid prototyping of linear controllers for non-linear systems. Further, mapping a MIMO non-linear physical model to the generalized LFT representation allows users to model non-linear controllers, Smith and model-predictive controllers, and other specialized control design techniques.

An embodiment of the invention can be used with MIMO systems. The invention can provide the ability to design MIMO control systems by designing each element and viewing the response of the closed loop system automatically. Input/Output (I/O) channels and closed-loop responses that are used by designers to verify that they have met the performance constraints on the signals and the design specifications of the control system individually. In one implementation, visual results can be immediately viewable in a graphical environment.

Accordingly, the present invention may be useful in the use of design tools that lend to the design of any type of linear time-invariant (LTI) model, including but not limited to continuous, discrete, hybrid, and multi-rate models, models with time delays, and models specified by measured frequency response data. Embodiments of the present invention can provide insight into time responses (time-domain behavior) of control systems, as well as frequency-domain characteristics, and poles and zero dynamics. A number of different linear analysis techniques can be employed within this framework.

In addition to analytical design techniques such as root locus and Bode or Nichols loop shaping, the framework of the present invention supports the deployment of systematic, automated tuning techniques, such as direct search, genetic algorithms, gradient-based optimization. These techniques can optimize a variety of time and frequency-domain criteria.

Figure 3:
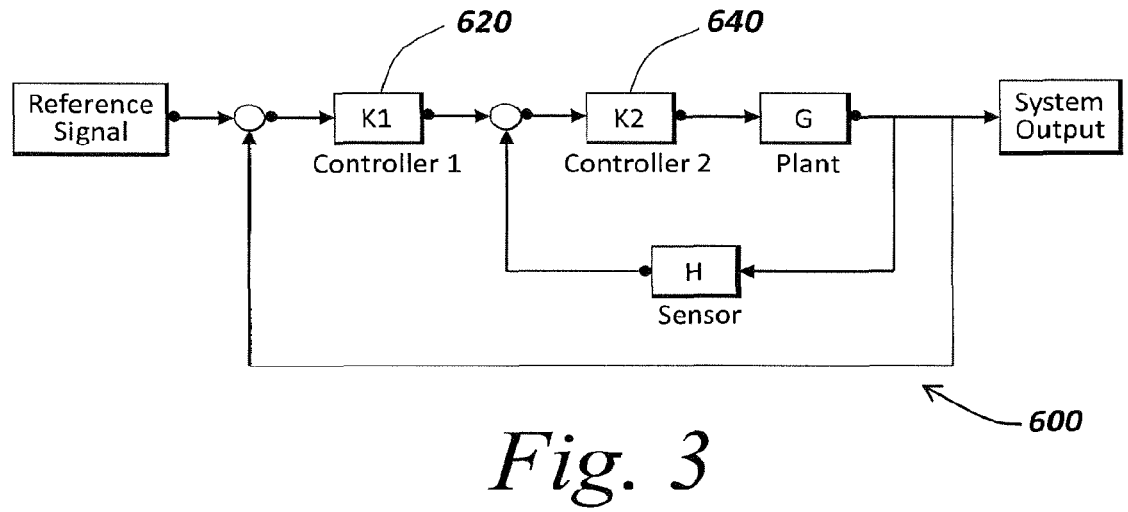
FIG. 3 is a diagrammatic illustration of a further example of a complex control system.
Figure 4:
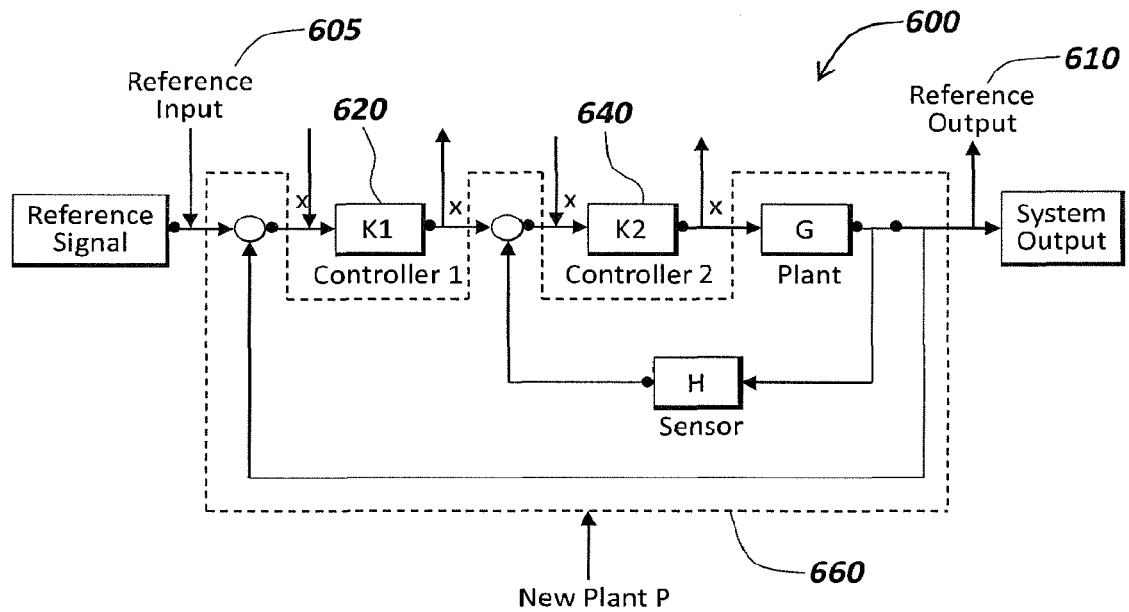
FIG. 4 is a diagrammatic illustration of the complex control system of FIG. 3.
Figure 5:
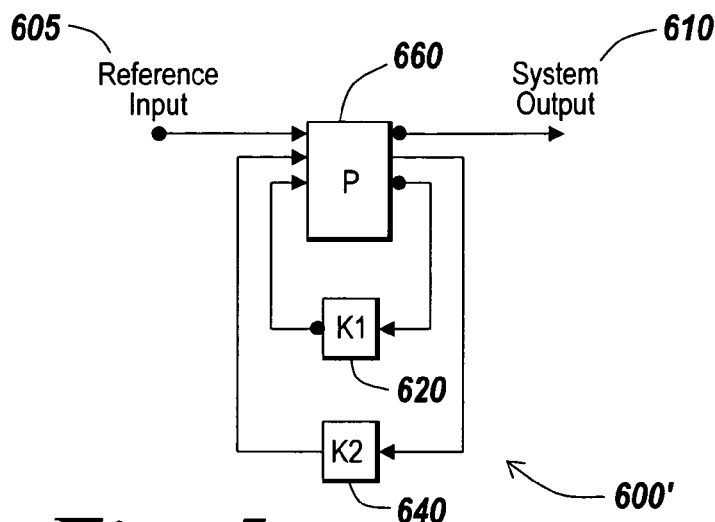
FIG. 5 is a simplified diagrammatic illustration of the complex control system of FIGS. 3 and 4.

An example of the ability to isolate individual elements in a plant system may be seen in FIGS. 3-5. With reference to FIG. 3, an example block diagram 600 is provided with a first controller 620 and a second controller 640. In this example, the user would like to design or analyze the first controller 620 and the second controller 640. As shown in FIG. 4, a user may use tools of the block diagram environment to illustrate the block diagram 600 with a new plant 660 that excludes the first controller 620 and the second controller 640 and defines the remainder of the block diagram. A reference input 605 and a reference output 610 have been defined to represent the input and output of the plant 660, respectively. FIG. 5 then illustrates the simplified block diagram 600, showing the first controller 620 and the second controller 640 relative to the plant 660. The reference input 605 and reference output 610 are also illustrated. The controllers in FIG. 5 may thus be analyzed separately from the remainder of the plant model initially seen in FIG. 3. The example of FIGS. 3-5 illustrate the graphical selection of controllers for design or analysis in a block diagram.

Figure 6:
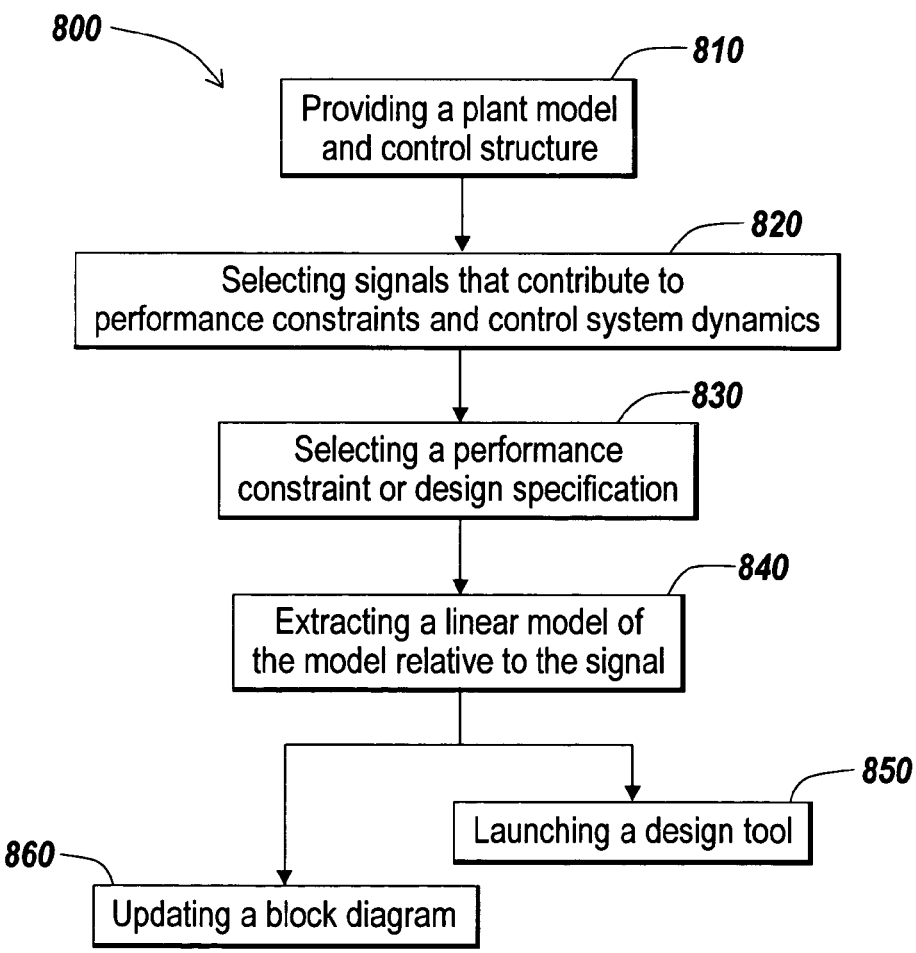
FIG. 6 is a method according to an embodiment of the present invention.
Figure 7:
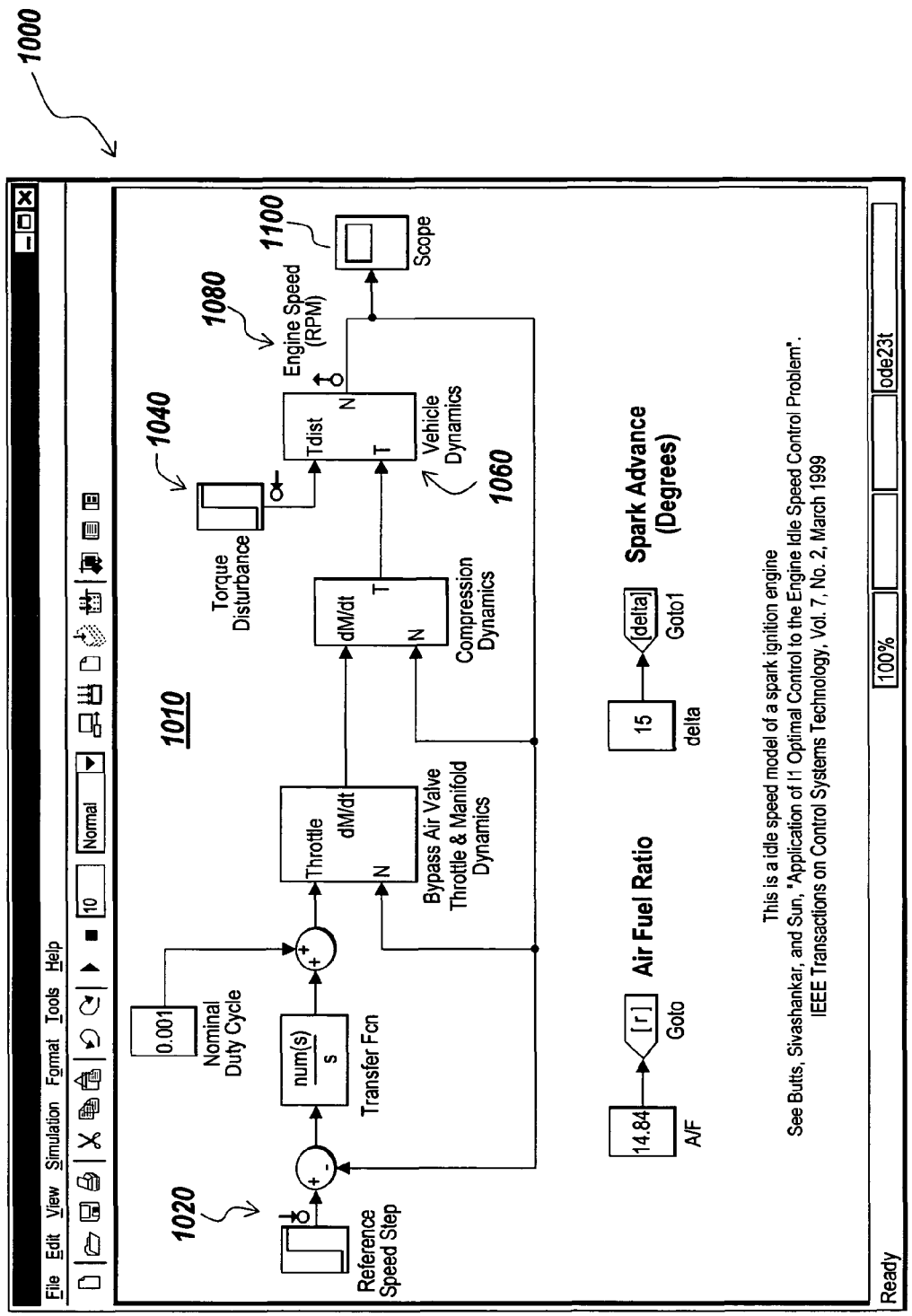
FIG. 7 depicts a GUI of a system being modeled by the illustrative embodiment of the present invention.

According to an embodiment of the invention, a method 800 is illustrated in FIG. 6. The method 800 includes optionally providing, step 810, a plant model and a control structure. For example, the user may use a block diagram simulation environment such as SIMULINK from The Math Works of Natick, Mass. to build a plant model and a control system architecture. An example of a plant model includes a power plant model with multiple generators, turbines and other components. Depending on the intended goal of the design or analysis, the user can select, step 820, signals that contribute to performance constraints and control system dynamics to apply design specifications and select, step 830 the performance constraints and design specifications. For example, the user would like to constrain the response between a disturbance and a controlled output. The signals may be, for example, closed loop signals. A wide variety of performance constraints and design specifications may be used. For example, design constraints could include design specifications on the control system such as stability margins and also could include more specific performance constraints such as settling time, overshoot constraints, and maximum deviation of a control variable due to a disturbance.

With the selection of the signals, step 820, the method 800 can use linearization tools available in SIMULINK and other simulation environments to extract, step 840, a linear model of the model relative to the signals. The linearization tool uses exact small signal linearization or large signal linearization tools such as black box models and describing functions to automatically extract a linear model at specified operating points. These linear models relate the effect of reference and disturbance input changes on the response of the control system. The linearization tool is known to those of ordinary skill in the art, and can have many different forms.

The process of exact small scale linearization is the approximation of complex physical models that yields a sufficiently simple model for engineering analysis tools. Exact small scale linearization is a well-known commonly used analysis tool that has been documented in many control textbooks. A fundamental principle of exact small scale linearization analysis is that the approximation of a complex physical model is accurate for regions near a baseline or operating point.

A large class of physical systems is typically modeled using sets of non-linear differential equations of motion. The differential equations are written in the form:

$$\dot{x}(t)=f(x(t),u(t))$$

$$y(t)=g(x(t),u(t)) \quad (3)$$

Where:
t—time
x(t)—A vector of model states of length n
$\dot{x}$(t)—A vector of the state derivatives of length n
u(t)—A vector of model inputs of length p
y(t)—A vector of model outputs of length q
f(x(t), u(t))—A non-linear function which maps x(t) and u(t) to the state derivatives $\dot{x}$(t).
g(x(t), u(t))—A non-linear function which maps x(t) and u(t) to the model outputs y(t).

Exact small scale linearization approximates a set of non-linear differential equations: The approximation is about an operating point where the states are at a nominal value $x(t)=x_0$ and the model inputs are at a nominal value $u(t)=u_0$. Exact small scale linearization uses a first order Taylor series approximation of (3) to give $$\dot{x}(t) \approx f(x_0, u_0) + \frac{\partial f}{\partial x}\bigg|_{\substack{x=x_0\\u=u_0}}(x(t)-x_0) + \frac{\partial f}{\partial u}\bigg|_{\substack{x=x_0\\u=u_0}}(u(t)-u_0) \quad (4)$$

$$y(t) \approx g(x_0, u_0) + \frac{\partial g}{\partial x}\bigg|_{\substack{x=x_0\\u=u_0}}(x(t)-x_0) + \frac{\partial g}{\partial u}\bigg|_{\substack{x=x_0\\u=u_0}}(u(t)-u_0).$$

Defining variables about the operating point:

$$\Delta x(t)=x(t)-x_0$$

$$\Delta u(t)=u(t)-u_0$$

$$\Delta y(t)=y(t)-g(x_0,u_0) \quad (5)$$

gives $$\Delta\dot{x}(t) \approx \frac{\partial f}{\partial x}\bigg|_{\substack{x=x_0\\u=u_0}}\Delta x(t) + \frac{\partial f}{\partial u}\bigg|_{\substack{x=x_0\\u=u_0}}\Delta u(t) \quad (6)$$

$$\Delta y(t) \approx \frac{\partial g}{\partial x}\bigg|_{\substack{x=x_0\\u=u_0}}\Delta x(t) + \frac{\partial g}{\partial u}\bigg|_{\substack{x=x_0\\u=u_0}}\Delta u(t)$$

or more commonly described as $$\Delta\dot{x}(t) \approx A\Delta x(t)+B\Delta u(t)$$

$$\Delta y(t) \approx C\Delta x(t)+D\Delta u(t) \quad (7)$$

where the matrices $$A = \frac{\partial f}{\partial x}\bigg|_{\substack{x=x_0\\u=u_0}} \quad B = \frac{\partial f}{\partial u}\bigg|_{\substack{x=x_0\\u=u_0}} \quad (8)$$

-continued $$C = \frac{\partial g}{\partial x}\bigg|_{\substack{x=x_0\\u=u_0}} \quad D = \frac{\partial g}{\partial u}\bigg|_{\substack{x=x_0\\u=u_0}}$$

are known as the Jacobian matrices. It is the task of a block diagram programming language tools to find the matrices A, B, C, and D.

In many block diagram programming tools, physical models can be described by both continuous differential equations and discrete equations of motion. These systems are known as multi-rate systems. This more general description of a multi-rate system is described by $$\dot{x}(t)=f(x(t),x_1(k_1),\ldots x_m(k_m),u(t))$$

$$x_1(k_1+1)=f_1(x(t),x_1(k_1),\ldots,x_m(k_m),u(t))$$

$$\cdot\cdot$$

$$\cdot\cdot$$

$$\cdot\cdot$$

$$x_m(k_m+1)=f_1(x(t),x_1(k_1),\ldots,x_m(k_m),u(t))$$

$$y(t)=g(x(t),x_1(k_1),\ldots,x_m(k_m),u(t)) \quad (9)$$

where
t—time
x(t)—A vector of model continuous model states of length n
$\dot{x}$(t)—A vector of the state derivatives of length n
$x_i(k_i)$—A vector of model discrete model states of length $n_i$ at a sample time $k_i$
u(t)—A vector of model inputs of length p
y(t)—A vector of model outputs of length q
$f(x(t), x_1(k_1), \ldots x_m(k_m), u(t))$—A non-linear function which maps x(t), $x_1(k_1), \ldots, x_i(k_i)$ and u(t) to the state derivatives $\dot{x}(t)$
$f_i(x(t), x_1(k_1), \ldots, x_m(k_m), u(t))$—A non-linear function which maps x(t), $x_1(k_1), \ldots, x_i(k_i)$ and u(t) to the update of the discrete state $x_i(k_i)$.
$g(x(t), x_1(k_1), \ldots, x_m(k_m), u(t))$—A non-linear function which maps which maps x(t), $x_1(k_1), \ldots, x_i(k_i)$ and u(t) to the model output y(t).

The typical approach for this type of problem is to approximate this multi-rate system by a single rate discrete system:

$$\Delta x(k+1)\approx A\Delta x(k)+B\Delta u(k)$$

$$\Delta y(k)\approx C\Delta x(k)+D\Delta u(k) \quad (10)$$

It is the task of a block diagram programming language tools to find the matrices A, B, C, and D. This is a well known and understood problem and has been implemented in many block diagram programming languages.

In addition to exact small scale linearization another methodology for extracting linear models is to use large scale linearization analysis known as describing function analysis. The describing function problem (see figure below) involves the selection of a linear filter, denoted as w(t), that approximates a non-linear operator n[u(t)] for a particular wave form u(t) that minimizes the integral square error over a time interval, T $$\int_0^T |e(t)|^2 \, dt.$$

The class of input wave forms applicable to the describing function approximation includes sinusoidal, random noise, and exponential inputs along with various input combinations.

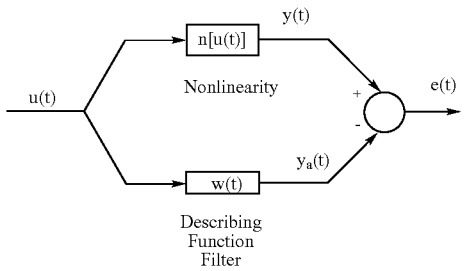

Describing
Function
Filter

The benefit of the describing function approach is that the approximation is a function of both the input signal and its amplitude. This method is used in many applications including aerospace applications to capture the effects of non-linearities on a feedback system.

A final method for the linearization of a non-linear system is through the use of black box modeling methodologies. This is an approach that is taken when the exact small scale or large scale linearizations are not applicable to a problem. Typically, when a system is described by both event and time based dynamics, small and large scale linearization approaches are not applicable. Internal combustion engine control problems are applications that are usually described as both event (combustion events) and time (manifold filling dynamics) based dynamics. The fundamental idea behind these methodologies is to use simulation to generate a set of data that is used to fit a black box model. The details of the model fitting are specific to each approach that is taken. Black box modeling methodologies are well known as engineering tools and are implemented in add-on products to MATLAB such as the System Identification Toolbox or the spectral estimation tools in the Signal Processing Toolbox. Once linearization is complete, users can have a generalized linear fractional representation of their model that is automatically loaded into a design tool.

The operating points of a physical model define its total "state" at any given time. For example, for a model of a car engine, the operating points are typically described by variables such as engine speed, throttle angle, engine temperature, and the surrounding atmospheric condition. The behavior or what it typically known as the "dynamics" of the model are generally affected by the levels of the operating points. In block diagram programming languages, such as SIMULINK, the user can specify the operating points through settings in each block in the model. The operating points may be specified in the provided plant model (step 810) or as a specified design constraint (step 830) in the sequence of steps discussed in FIG. 6. Trim or equilibrium operating points are a special type of operating point that engineers find very useful. A basic description of equilibrium conditions is that, over time, the operating point remains steady and constant.

In SIMULINK and all other block diagram simulation tools there are two commonly used approaches to specifying equilibrium conditions of a physical model. The first method is that the users employ their intuitive knowledge about the system to pick an equilibrium condition. This can be a very time consuming and difficult process due to the large number of operating points that must be specified in a complicated physical model. The second option is to employ an approach known as trim analysis. The approach is to use optimization to solve for a set of operating points that satisfy the equilibrium conditions.

Trim analysis works well for small models, but for large models, initial guesses of the values $x(t), x_1(k_1), \ldots, x_i(k_i)$ and $u(t)$ must be chosen very close to an equilibrium operating point. This can be a problem since there are a large number of unknown variables that must be specified. Another approach is to utilize simulation to recover a set of equilibrium conditions. Simulation based operating points can be generated with SIMULINK CONTROL DESIGN using the time-based and trigger-based operating point snapshot feature. The time-based operating point snapshot creates a snapshot of the operating point when the simulation clock reaches the time specified by the user. The trigger-based operating point snapshot generates an operating point when triggered.

The user can select a design methodology to tune or design the control elements in the system. An important aspect of this framework is that many well-known methodologies can be leveraged to seamlessly assist in the design of the feedback controllers. For example since linear models can be extracted from the non-linear block diagram, classical methodologies such as Bode plots and root locus can be employed. Additionally, more advanced control techniques, including H-infinity, optimal control, etc., can be used. The tool can then automatically map user-defined performance constraints and design specifications on the control system to problem specific requirements on these advanced control techniques. For example, in the case of a second order performance constraint such as a step response, or overshoot is mapped to restricted pole locations on a root locus or closed magnitude response curves on a Nichols plot.

Once controllers are tuned and/or analyzed, the block diagram in which they belong, can be updated, step 860. For example, the controller can be uploaded to a SIMULINK model which can validate the controller against a full scale non-linear model. In addition to updating the controller elements in a model, the operating point can also be updated. For example, a user may specify a steady state operating point before the controller is updated. When the controller has been updated the user can be given tools to ensure that the equivalent steady state operating point is maintained.

According to embodiments of the invention, control design in SIMULINK can be an integrated environment. Tools and GUIs can interact to develop models, set operating points, linearize as needed, launch design tools, step 850, and export completed compensator designs back to SIMULINK. According to embodiments of the invention, using a graphical user interface, a user can systematically design and tune controllers in real time. The GUI will allow users to see the results of their tuning in real-time. Cross-coupling and other parasitic effects are immediately viewable. For MIMO systems, a user may simultaneously tune multiple controllers and immediately view responses.

A further example of a GUI according to an embodiment of the invention will be discussed in relation to FIGS. 7-14 and use with SIMULINK. One of ordinary skill in the art will appreciate that the illustrated graphical user interfaces and discussion of SIMULINK are provided for purposes of example only and the invention is not limited to the illustrated example.

A GUI 1000 is illustrated having a block diagram model 1010 of an idle speed controller for a spark ignition engine. The block diagram model 1010 can be used to control the engine speed based on changes in the speed references and torque disturbances. Therefore, in the present example, three closed loop signals are selected to be designed: the reference speed step 1020, the torque disturbance 1040 and the vehicle dynamics 1060. The engine speed 1080 output can be displayed on a scope 1100.

Figure 8:
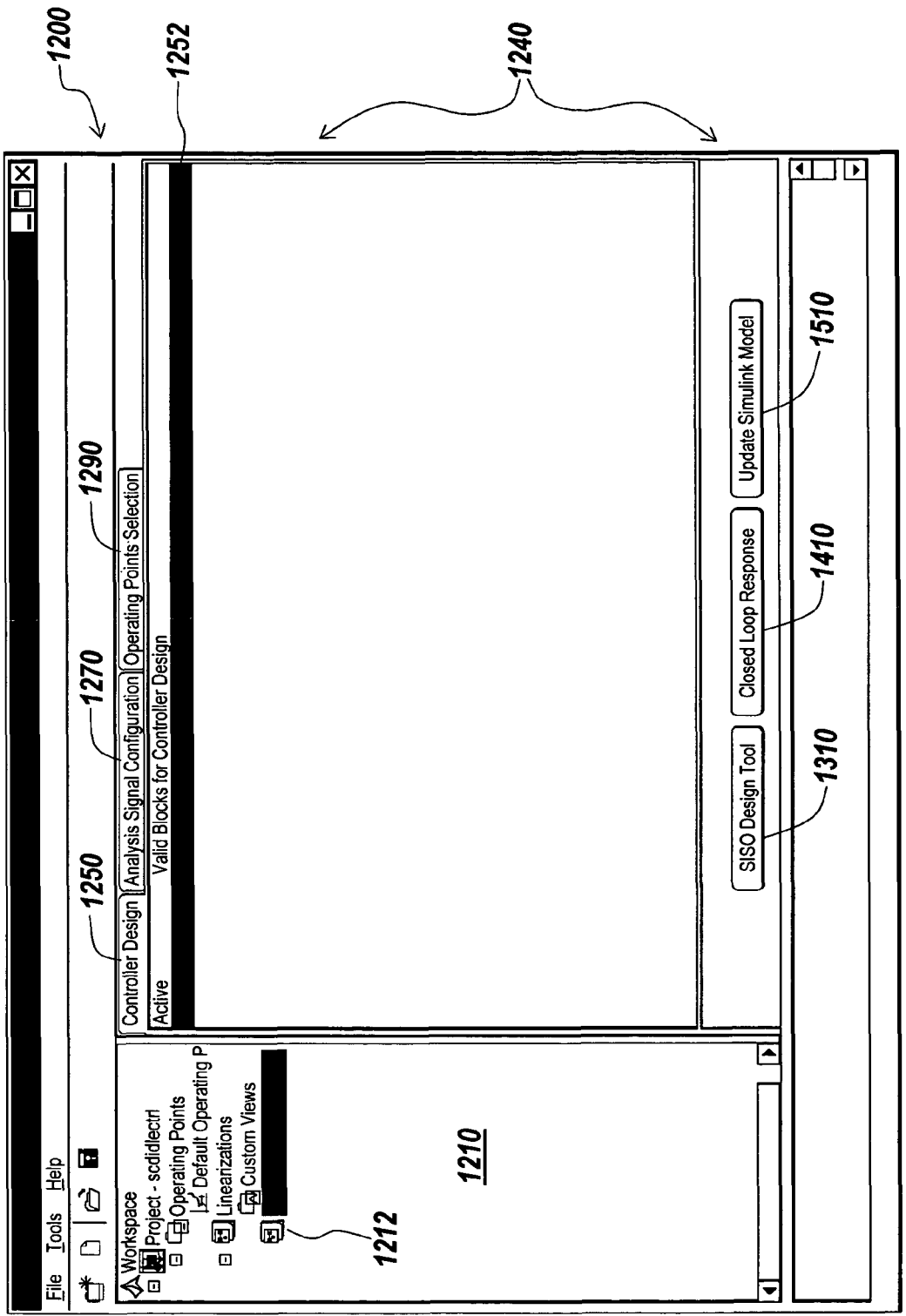
FIG. 8 is a GUI of controller design parameters in a control and estimation tools manager in the illustrative embodiment of the present invention.

FIG. 8 illustrates a GUI 1200 that can provide access to various displays according to an embodiment of the invention. The workspace navigation window 1210 enables navigation to the compensator design selection 1212, prompting the details window 1240. A series of tabs is provided to select the view of the details window 1240, including a controller design tab 1250, an analysis signal configuration tab 1270 and an operating points selection tab 1290. The idle speed controller entry 1252 selects the idle speed controller of FIG. 7.

Figure 9:
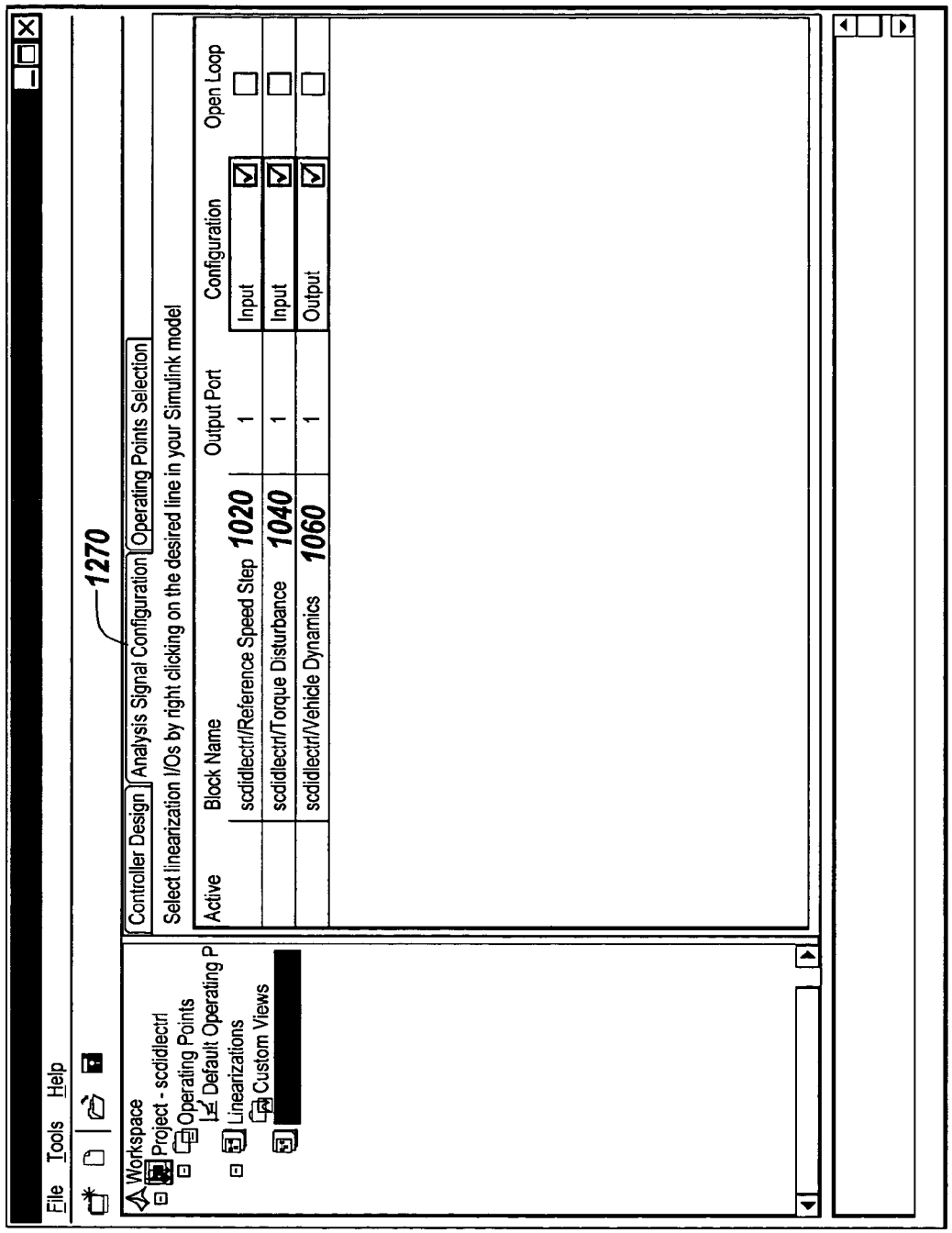
FIG. 9 is a GUI of analysis signal configuration parameters in a control and estimation tools manager in the illustrative embodiment of the present invention.

FIG. 9 illustrates an example view of the details window 1240 upon selection of the analysis signal configuration tab 1270. In the example, the three closed loop signals in the model are illustrated and selected as active, including the reference speed step 1020, the torque disturbance 1040 and the vehicle dynamics 1060. Various settings may be configured including the setting of performance constraints for each of the signals and design specifications on the control system.

Figure 10:
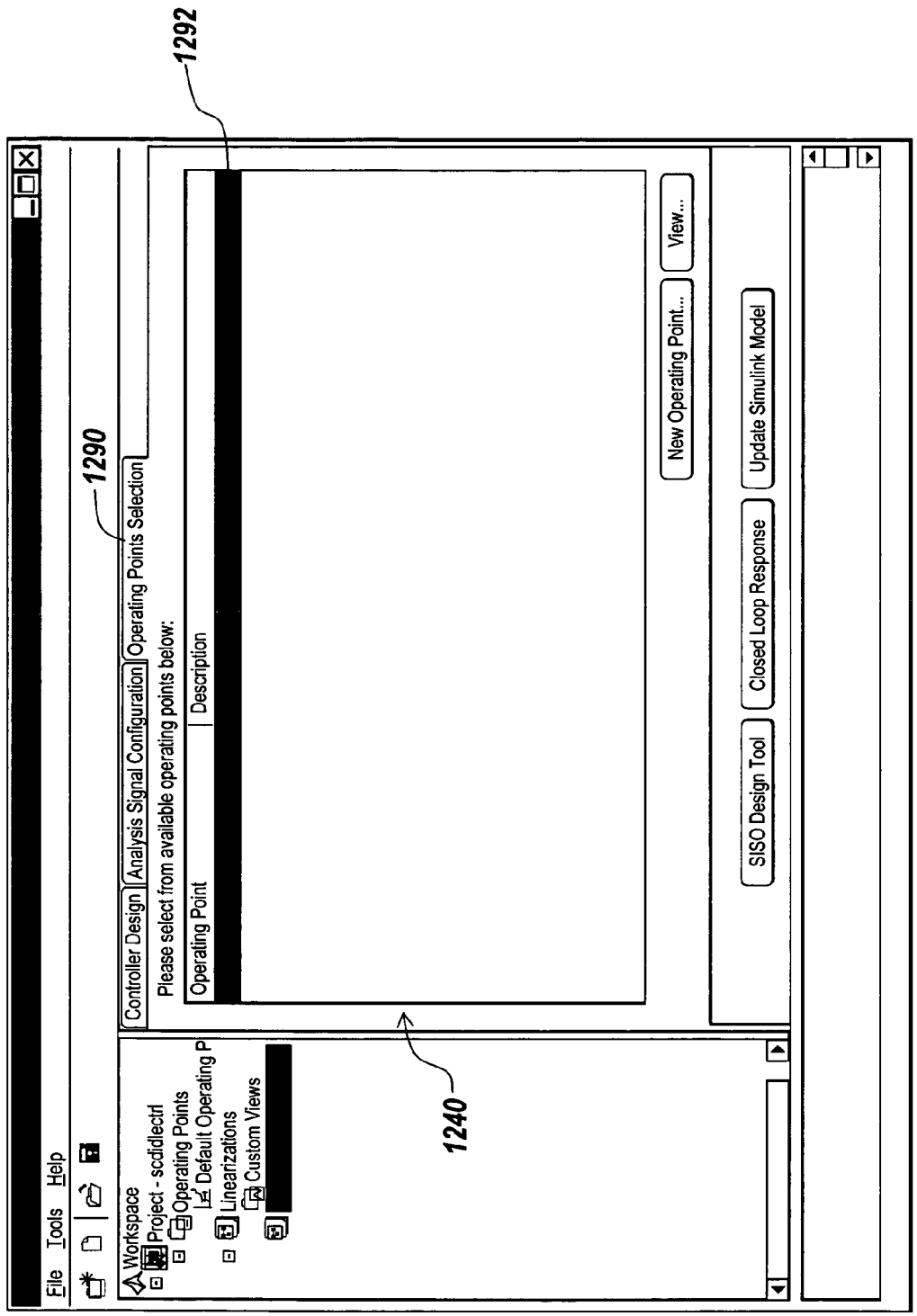
FIG. 10 is a GUI of operating points parameters in a control and estimation tools manager in the illustrative embodiment of the present invention.

FIG. 10 illustrates an example view of the details window 1240 upon selection of the operating points selection tab 1290. A single default operating point selection 1292 for use in linearizing the model is shown, although many operating point configurations may be illustrated and available to be selected.

Figure 11:
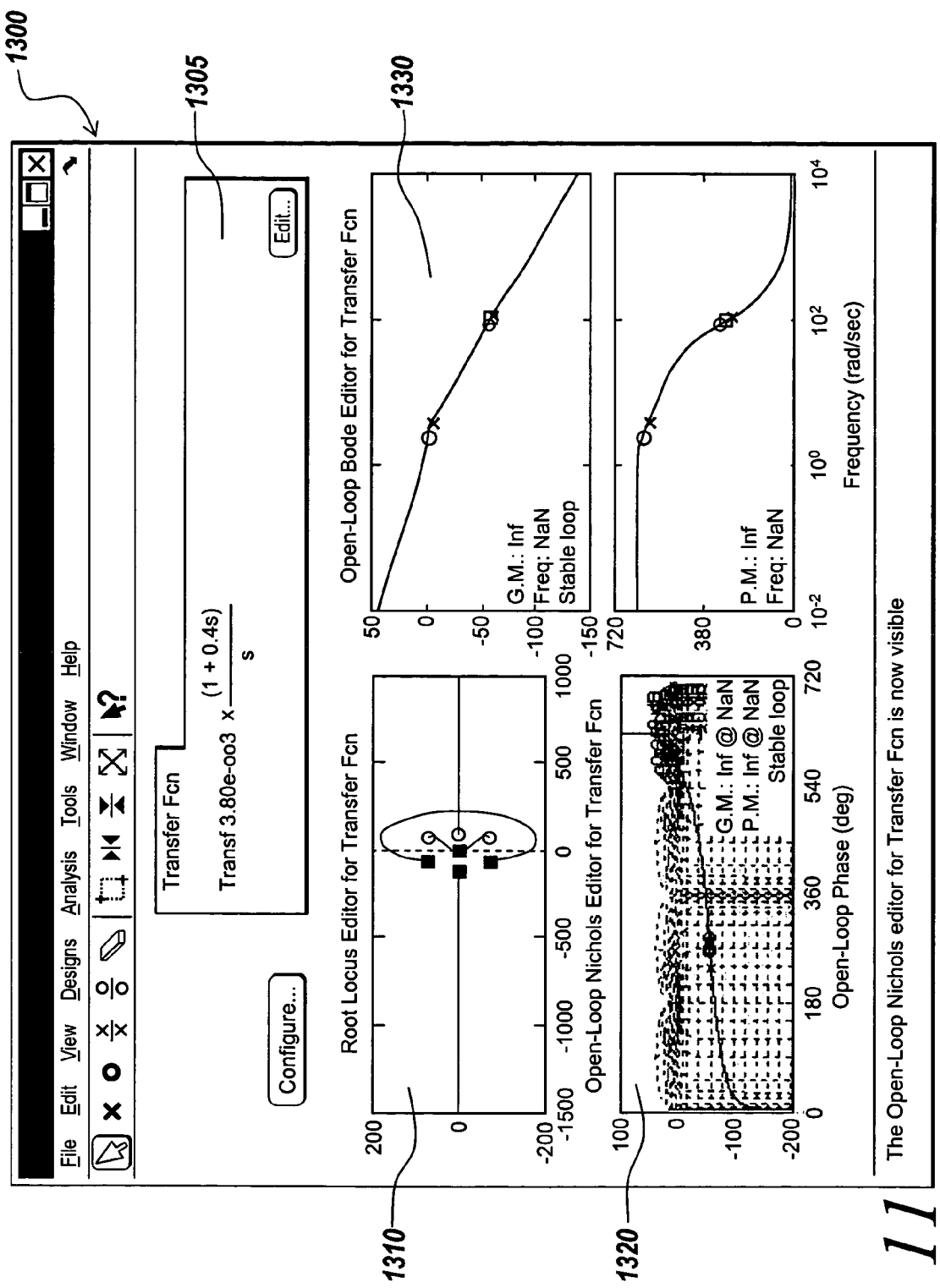
FIG. 11 is an example of a design tool that may be used with the invention.

With reference to FIG. 8, a series of buttons is also provided to provide access to additional functions. For example, a design tool may be launched by a button 1310. An example of a SISO (single input, single output) design tool 1300 is illustrated in FIG. 11. The SISO design tool 1300 includes a displayed transfer function 1305. A Root Locus Editor for Transfer Function window 1310, a Nichols Plot Editor for Transfer Function window 1320, and an Open Loop Bode Editor for Transfer Function window 1330 are also included. The SISO design tool allows for many performance constraints and design specifications to be specified on a feedback control system and its signals to be employed directly in a design. The tool allows for design specification on a control system such as stability margin characteristics to be mapped to the Root Locus, Open-Loop Bode and Nichols Plot editors.

Figure 12:
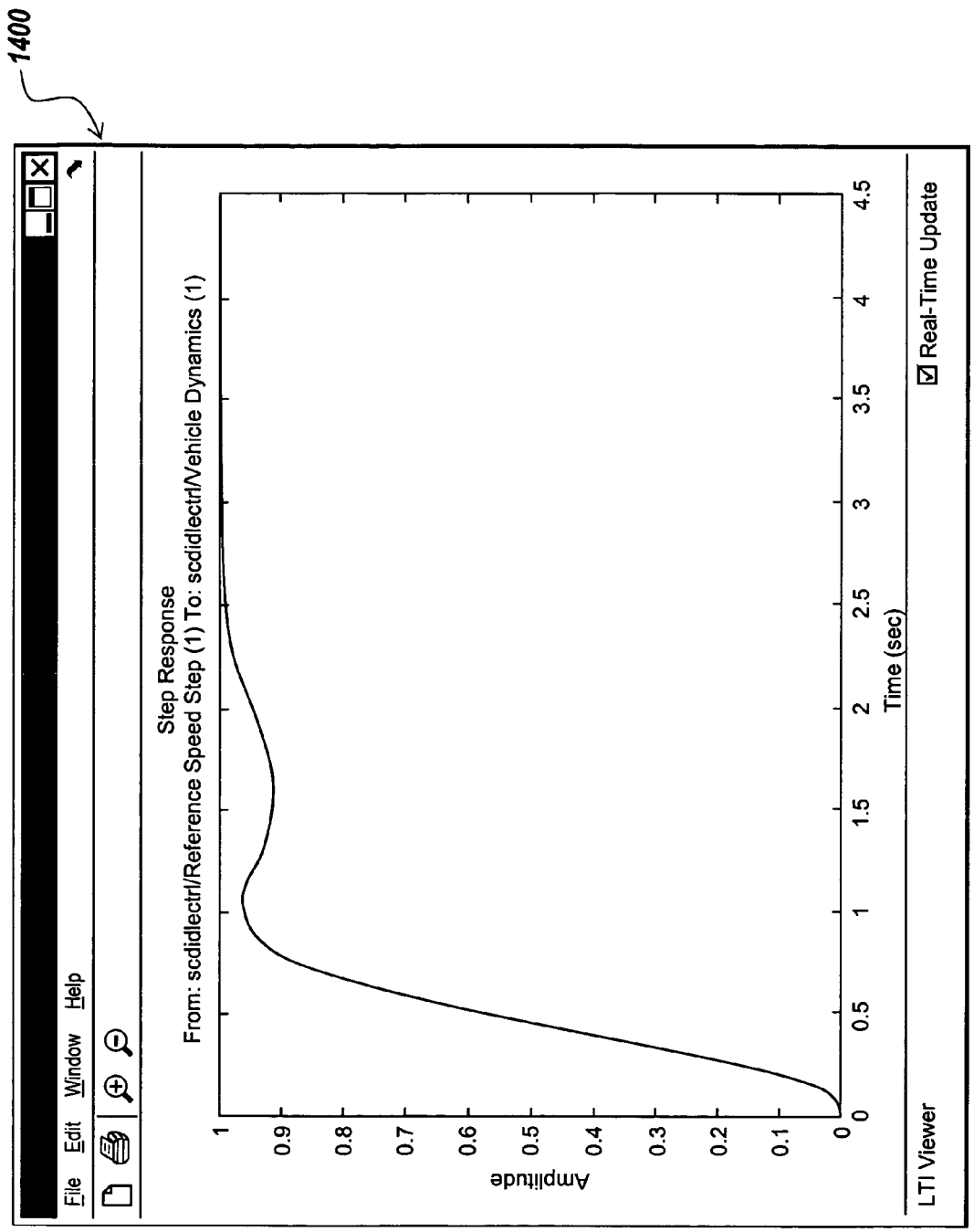
FIG. 12 is an example of a viewer that may be used with the invention.

FIG. 12 provides an example of a closed loop response viewer 1400 available by selecting another button 1410. A third button 1510, shown in FIG. 8 can trigger an update to the block diagram model. An example dialog GUI 1500 is illustrated in FIG. 13.

Figure 13:
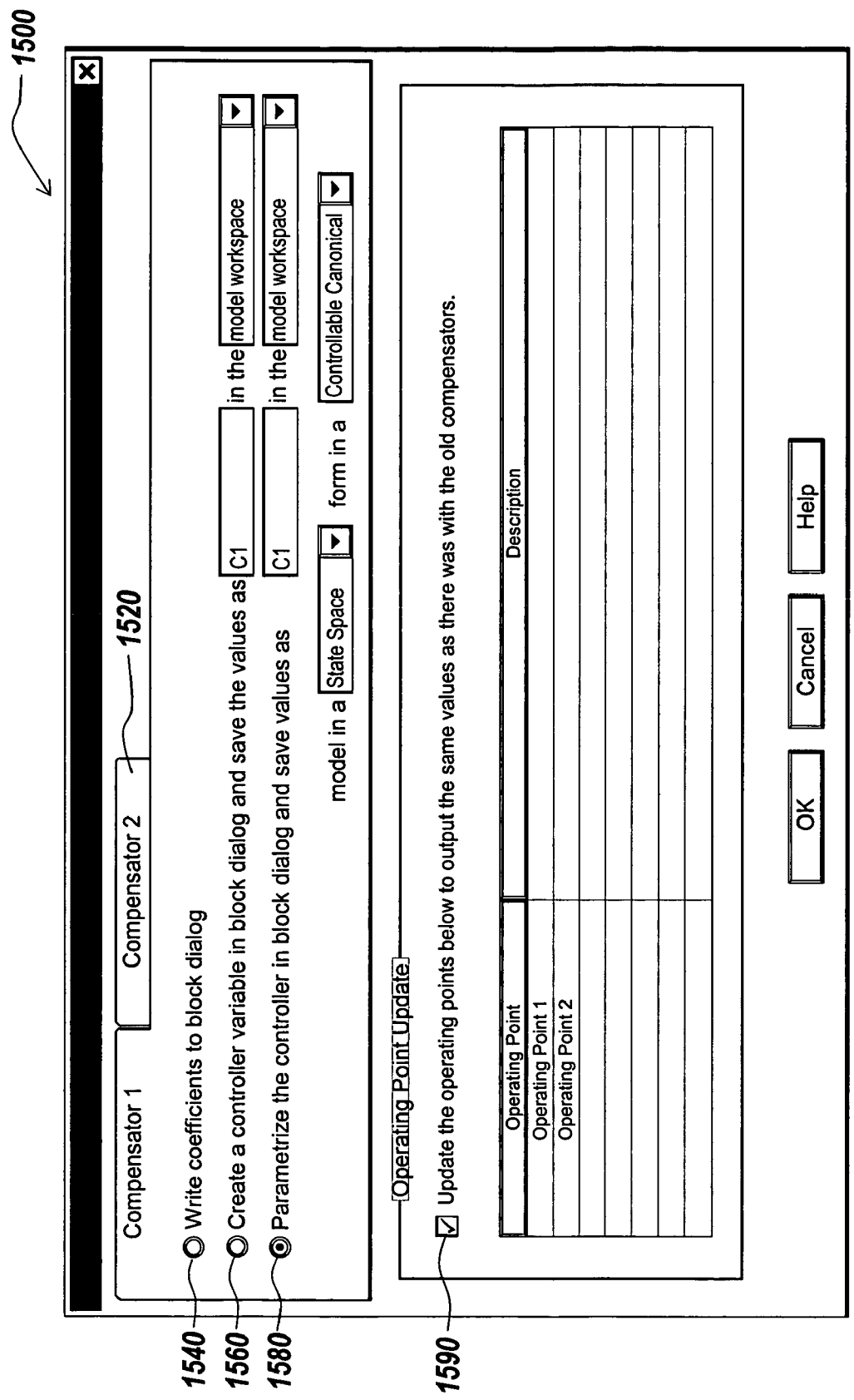
FIG. 13 is an illustration of a GUI according to an embodiment of the invention.

FIG. 13 illustrates various options for updating a block diagram model, such as a SIMULINK block diagram model. Tabs 1520 are provided to select the desired compensator. For each compensator, the GUI 1500 allows a selection from the following options: write coefficients to a block dialog, 1540, parameterize the controller in a block dialog 1560 and create a controller variable in a block dialog 1580. Also, updating the block diagram model may include updating an operating point of the block diagram model 1590.

Figure 14:
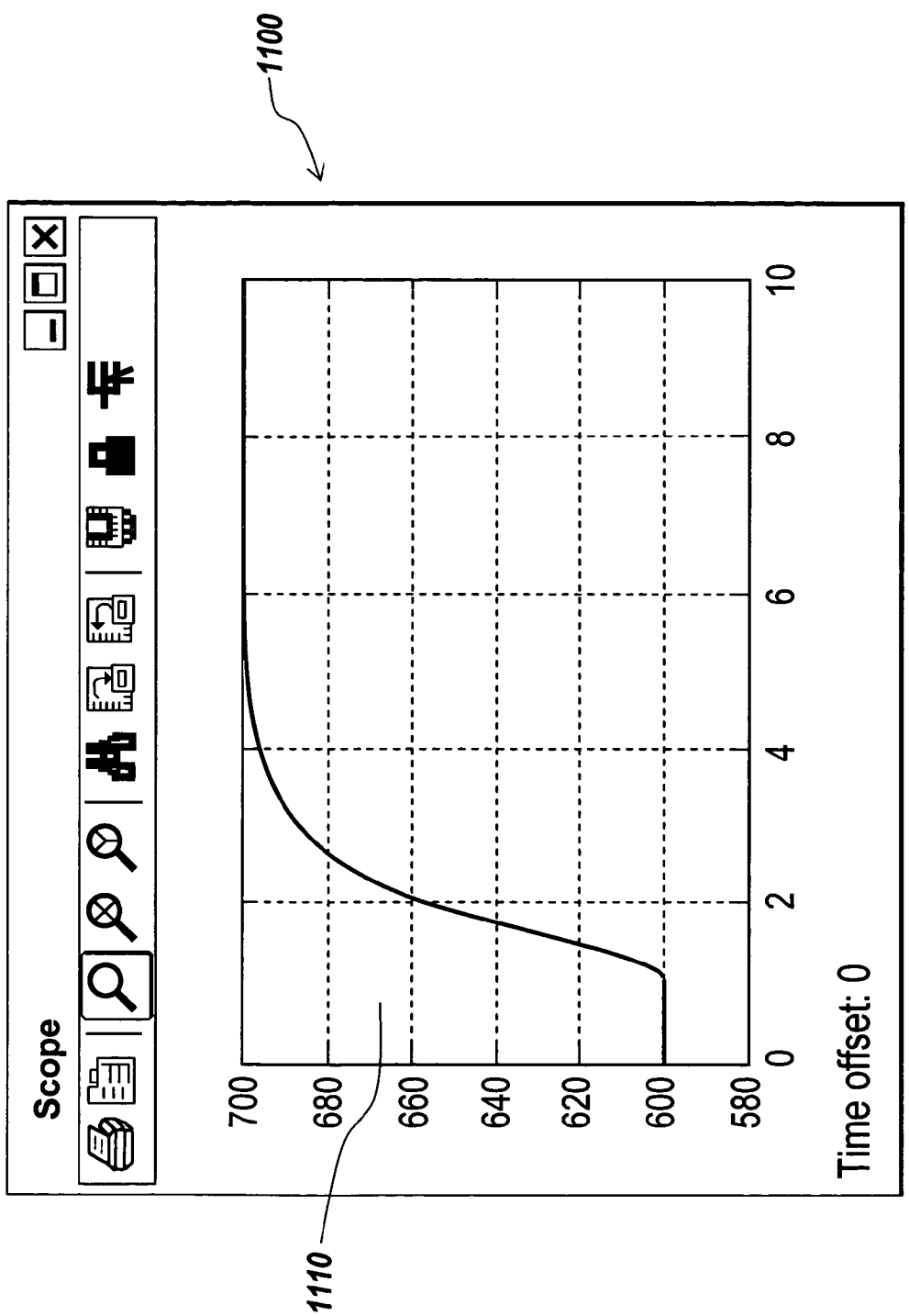
FIG. 14 is an illustration of a scope that may be used with the invention.

FIG. 14 illustrates the scope 1100 displaying the engine speed output signal 1110. When the compensator parameters have been updated in the block diagram model, non-linear simulations can be completed to verify the performance of the controller design.

A further example of implementing the invention with SIMULINK can be summarized in a four-step, model-based design process. The first step occurs in SIMULINK. A plant model is developed and a control structure is defined. Any block diagram based Math Works tools for modeling may be used, including, for example, the SIGNAL PROCESSING BLOCKSET, STATEFLOW, and SIMULINK FIXED POINT.

Step two involves SIMULINK CONTROL DESIGN. In this step, a user can specify which parts of the block diagram model to be linearized. SIMULINK CONTROL DESIGN has algorithms that analyze the block diagram to determine which blocks must be involved to correctly linearize the subsystem you have selected. Therefore, the user specifies closed loop signals, sets SIMULINK model operating points and establishes control system design specifications and performance constraints for specific signals in the block diagram. These design specifications and performance constraints can include many standard engineering requirements for a control system. These include $2^{nd}$ order system specifications such as rise and settle time, overshoot constraints, reference tracking performance constraints along with control system design specifications such as gain, phase, and delay margin of a feedback loop. Performance constraints on the norm properties of signals in the system. These include $H_\infty$, L2, and $L_\infty$ constraints. The model is then linearized, enabling the use of a design tool.

Step three occurs in one or more analysis and/or design tools. The details of the linear model are loaded into the design tool. The user designs the compensator, optionally utilizing rapid prototyping. In this step, many Math Works design tools may be used. Examples of possible design techniques include classical and modern control approaches, stochastic control, Kalman filtering, and model predictive control. The rapid prototyping techniques refer to synthesis routines such as $H_\infty$, $H_2$, μ-Synthesis, LQG, LQR, and LTR. When a linear model is loaded into a design tool the performance constraints that a user imposes on a signal or design specifications on a feedback loop will mapped to specific design criterion. An example of this would be the mapping of $2^{nd}$ order performance constraints like overshoot and settle time to the closed loop pole location on a root locus. Additionally gain, phase, and delay margins can be mapped to required constraints on Bode, Nyquist, and Nichols plots. The performance constraints and design specifications additionally can also be applied to the synthesis routines that are mentioned above. For example, the trade off between performance and stability is a well understood application in synthesis methods using weights on the resulting optimization problem. In this case the constraints and specifications from step two are mapped to this trade off. During the design process the response of the linear closed loop system can always be viewed in any linear response type plot. These response plots include step, impulse, Bode, Nyquist, Nichols, singular value, and pole zero plots. Included in the plots will be the performance constraints and design specifications that the user has employed. The closed and open loop linear responses of the control system can be examined and the results of the design can be exported back to SIMULINK.

In step four, once a candidate compensator design is established, SIMULINK can be used to fully evaluate how well that design meets specifications. For example, a user can validate the design with the newly-designed compensator functioning in the block diagram model. The validation can be automated by comparing the user-defined design specifications to the resulting non-linear simulation. Simulations on the full non-linear physical model plus the compensator can be run. The Real Time Workshop can be used to speed up simulation or generate embeddable C-code.

Figure 15:
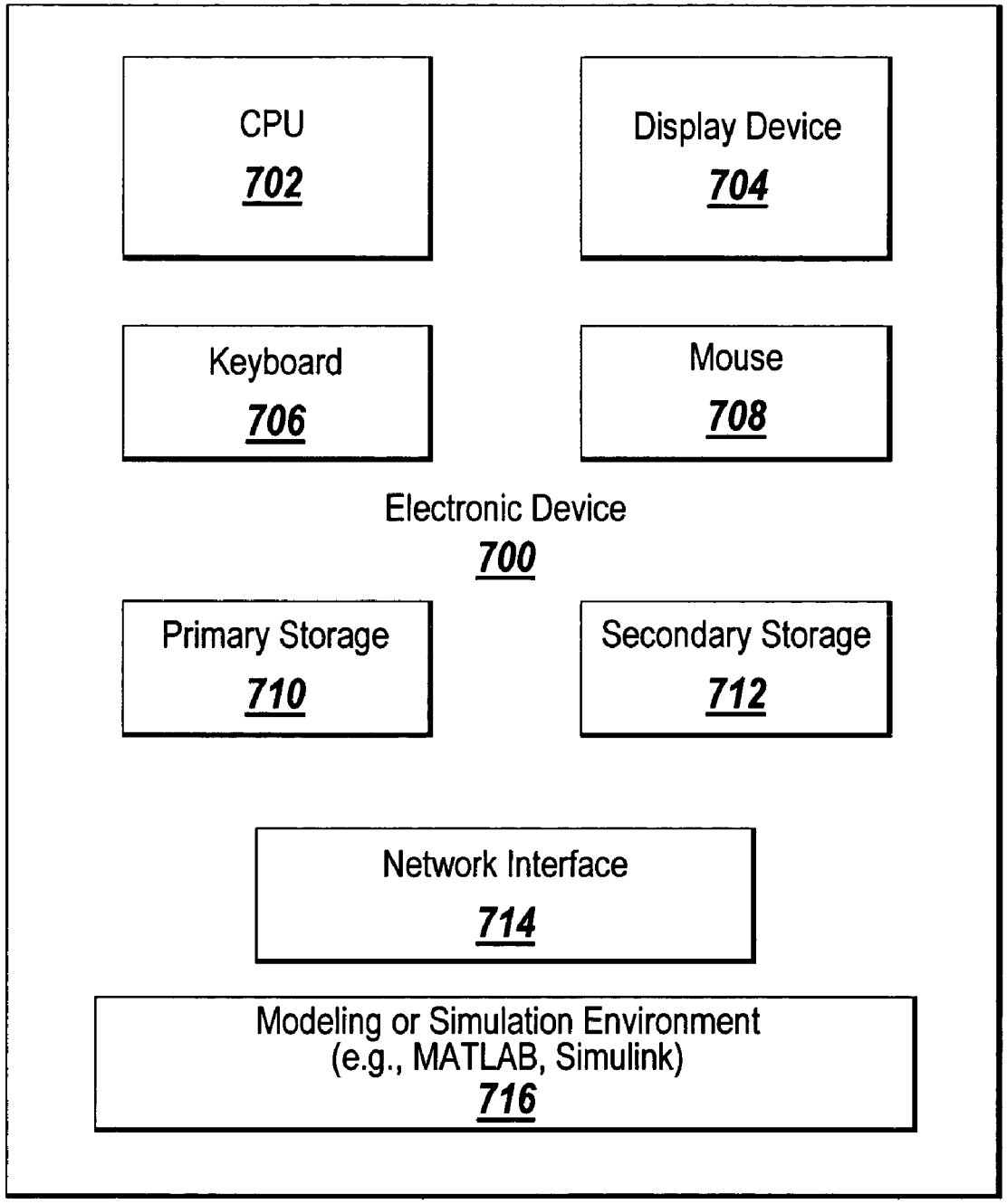
FIG. 15 is a diagrammatic illustration of an electronic device for use in implementing the present invention.

The present invention can be implemented on an electronic device. FIG. 15 illustrates one example embodiment of an electronic device 700 suitable for practicing the illustrative embodiments of the present invention. The electronic device 700 is representative of a number of different technologies, such as personal computers (PCs), laptop computers, workstations, personal digital assistants (PDAs), Internet appliances, cellular telephones, wireless devices, and the like. In the illustrated embodiment, the electronic device 700 includes a central processing unit (CPU) 702 and a display device 704. The display device 704 enables the electronic device 700 to communicate directly with a user through a visual display. The electronic device 700 further includes a keyboard 706 and a mouse 708. Other potential input devices not depicted include a stylus, trackball, joystick, touch pad, touch screen, and the like. The electronic device 700 includes primary storage device 710 and secondary storage device 712 for storing data and instructions. The primary and secondary storage devices 710 and 712 can include, but are not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on one or both of the primary and secondary storage devices 710 and 712. The electronic device 700 can also include a network interface 714 for communicating with one or more electronic devices external to the electronic device 700 depicted. Modems and Ethernet cards, are examples of network interfaces 714 for establishing a connection with an external electronic device or network. The CPU 712 has either internally, or externally, attached thereto one or more of the aforementioned components. In addition to applications previously mentioned, simulation and/or modeling applications 716, such as MATLAB, or SIMULINK, can be installed and operated on the electronic device 700.

It should be noted that the electronic device 700 is merely representative of a structure for implementing the present invention. However, one of ordinary skill in the art will appreciate that the present invention is not limited to implementation on only the described device 700. Other implementations can be utilized, including an implementation based partially or entirely in embedded code, where no user inputs or display devices are necessary. In such an instance, a processor can communicate directly with another processor, or other device.

Examples of industries in which control systems are used include, but are not limited to, Aerospace, Automotive, Chemical, Biochemical/Pharmaceutical, Process (e.g., paper mills). Embodiments of the present invention may have broad applications to all these industries.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. A computer-readable medium holding computer-executable instructions that when executed on one or more processors in an electronic device provide a design tool for control design, the medium holding:
one or more instructions for using said design tool to provide a graphical view of a non-linear block diagram model that includes a control system, said control system including a plurality of controllers for controlling an operation of a physical plant, said plurality of controllers including one or more blocks;
one or more instructions for:
receiving a selection, with said design tool, of at least two of said plurality of controllers that control the operation of the physical plant;
one or more instructions for:
programmatically extracting, with said design tool, a linear model from said non-linear block diagram model, said linear model modeling said selected at least two of said plurality of controllers that control the operation of the physical plant;
one or more instructions for tuning said linear model to produce a tuned linear model, said tuning causing said linear model to satisfy a performance constraint or a design specification;
one or more instructions for displaying at least one characteristic of said tuned linear model on a display device; and
one or more instructions for updating said non-linear block diagram model by updating said selected at least two of said plurality of controllers of said non-linear block diagram model with said tuned linear model, the updating comprising programmatically updating an operating point used to linearize said selected at least two of said plurality of controllers.

2. The medium of claim 1, wherein said design tool comprises at least one of: an open loop tool, a closed loop tool, a Bode plot tool, a Nichols plot tool, a root/locus tool, a discretization tool, and a tuning tool.

3. The medium of claim 1, further holding:
one or more instructions for updating programmatically said non-linear block diagram model based on the results of an analysis performed on said linear model.

4. The medium of claim 3, further holding:
one or more instructions for updating said non-linear block diagram model by programmatically updating block data.

5. The medium of claim 1, further holding:
one or more instructions for specifying one of a performance constraint for a first signal and a design specification for dynamics of said control system.

6. The medium of claim 5, wherein said one of a performance constraint for said first signal and a design specification for said dynamics of said control system are programmatically mapped to said design tool.

7. The medium of claim 1,
wherein said receiving includes receiving a selection of blocks representing said selected at least two of said plurality of controllers with said design tool, and wherein the medium further holding:
one or more instructions for identifying a design specification or one or more performance constraints in said non-linear block diagram model related to at least one of said at least two or more of said plurality of controllers using said design tool;

one or more instructions for receiving a selection of signals relating to said at least one of said two or more controllers; and one or more instructions for mapping programmatically one or more of said identified one or more performance constraints or said identified design specification to said linear model using said design tool.

8. The medium of claim 7, further holding:
one or more instructions for updating programmatically said non-linear block diagram model based on results of an analysis performed on said linear model.

9. The medium of claim 7, further holding:
one or more instructions for updating said non-linear block diagram model by programmatically updating block data.

10. The medium of claim 7, wherein said design tool comprises at least one of the group of an open loop tool, a closed loop tool, a Bode plot tool, a Nichols plot tool, a root/locus tool, a discretization tool, and a tuning tool.

11. The medium of claim 10, further holding:
one or more instructions for initiating execution of a closed loop response viewer.

12. The medium of claim 7, further holding:
one or more instructions for providing a plant model and control structure prior to said selecting of a block representative of a controller.

13. The medium of claim 7, further holding:
one or more instructions for selecting an operating point, said operating point used to linearize said selected at least two of said plurality of controllers.

14. The medium of claim 7, wherein said receiving a selection of blocks is performed in a graphical environment.

15. The medium of claim 7, wherein said linear model is programmatically extracted using one of exact small scale linearization, black box linearization and large scale linearization.

16. The medium of claim 1, further holding:
one or more instructions for updating programmatically said non-linear block diagram model by importing at least one characteristic of at least one of said plurality of controllers into said block diagram model, said updated non-linear block diagram model displayed on a display device.

17. The medium of claim 16, further holding:
one or more instructions for estimating an operating point in said model prior to said extracting.

18. The medium of claim 17, wherein said non-linear block diagram model is updated by updating a data value for a block in said non-linear block diagram model.

19. The medium of claim 18, wherein said updating includes writing coefficients to a block dialog.

20. The medium of claim 19, wherein said updating includes parameterizing said controller in a block dialog.

21. The medium of claim 19, wherein said updating includes creating a controller variable in a block dialog.

22. The medium of claim 16, wherein said instructions further comprise:
one or more instructions for entering a design criteria prior to said extracting.

23. The medium of claim 16, further holding:
one or more instructions for applying said design tool to said linear model;
one or more instructions for designing at least one of said plurality of controllers to satisfy at least one of a performance constraint on a signal and a design specification on dynamics of said control system; and one or more instructions for transforming said at least one of said performance constraint and said design specification to be used directly in said design tool.

24. The medium of claim 16, further holding:
one or more instructions for specifying one of a performance constraint for a signal relating to said plurality of controllers and a design specification for dynamics of said control system; and
one or more instructions for automatically operating on said linear model to produce a result.

25. The computer-readable medium of claim 1, wherein said receiving a selection of at least two of said plurality of controllers comprises receiving a selection of two or more locations in said control system, said two or more locations associated with signals in said control system.

26. The medium of claim 1, further holding:
one or more instructions for uploading said tuned linear model to said non-linear block diagram model.

27. In a computer, a computer-implemented method of extracting a linear model from a non-linear block diagram model that includes a control system, said linear model extracted via a design tool, said control system including a plurality of controllers for controlling an operation of a physical plant, said plurality of controllers including one or more blocks, said linear model displayed in a graphical view, said method comprising:
selecting with said design tool, at least two of said plurality of controllers that control the operation of the physical plant;
programmatically extracting, with said design tool on said computer, a linear model from said non-linear block diagram model, said linear model modeling said selected at least two of said plurality of controllers that control the operation of the physical plant; and
tuning said linear model using said computer to produce a tuned linear model, said tuning causing said linear model to satisfy at least one performance constraint or design specification;
displaying at least one characteristic of said tuned linear model on a display device; and
updating said non-linear block diagram model by updating said selected at least two of said plurality of controllers of said non-linear block diagram model with said tuned linear model, the updating comprising programmatically updating an operating point used to linearize said selected at least two of said plurality of controllers.

28. The method of claim 27, wherein said design tool comprises at least one of: an open loop tool, a closed loop tool, a Bode plot tool, a Nichols plot tool, a root/locus tool, a discretization tool, and a tuning tool.

29. The method of claim 27, further comprising:
updating programmatically said non-linear block diagram model based on results of an analysis performed on said linear model.

30. The method of claim 29, further comprising:
updating said non-linear block diagram model by programmatically updating block data.

31. The method of claim 27, further comprising:
specifying one of a performance constraint for a first signal and a design specification for dynamics of said control system.

32. The method of claim 31 wherein said one of a performance constraint for said first signal and a design specification for said dynamics of said control system are programmatically mapped to said design tool.

33. The method of claim 27, wherein blocks representing two or more controllers in said non-linear block diagram model are selected with said design tool, and wherein the method further comprises:
- identifying a design specification or one or more performance constraints in said non-linear block diagram model related to at least one of said two or more controllers using said design tool;
- selecting signals relating to at least one of said two or more controllers; and
- mapping programmatically one or more of said identified one or more performance constraints or said identified design specification to said linear model using said design tool.

34. The method of claim 33, further comprising:
- updating programmatically said non-linear block diagram model based on results of an analysis performed on said linear model.

35. The method of claim 33, further comprising;
- updating said non-linear block diagram model by programmatically updating block data.

36. The method of claim 33, wherein said design tool comprises at least one of the group of an open loop tool, a closed loop tool, a Bode plot tool, a Nichols plot tool, a root/locus tool, a discretization tool, and a tuning tool.

37. The method of claim 36, further comprising:
- initiating execution of a closed loop response viewer.

38. The method of claim 33, said method further comprising:
- providing a plant model and control structure prior to selecting said blocks representing two or more controllers in said non-linear block diagram model.

39. The method of claim 33, said method further comprising:
- selecting an operating point to linearize said selected at least two of said plurality of controllers.

40. The method of claim 33, wherein selecting said blocks is performed in a graphical environment.

41. The method of claim 33, wherein said linear model is programmatically extracted using one of exact small scale linearization, black box linearization and large scale linearization.

42. The method of claim 27, wherein the method further comprises:
- updating programmatically said non-linear block diagram model by importing at least one characteristic of at least one of said plurality of controllers into said non-linear block diagram model, said updated block diagram model displayed on a display device.

43. The method of claim 42, wherein said method further comprises:
- estimating an operating point in said model prior to extracting said linear model.

44. The method of claim 43, wherein said non-linear block diagram model is updated by updating a data value for a block in said model.

45. The method of claim 44, wherein said updating includes writing coefficients to a block dialog.

46. The method of claim 45, wherein said updating includes parameterizing said controller in a block dialog.

47. The method of claim 45, wherein said updating includes creating a controller variable in a block dialog.

48. The method of claim 42, further comprising:
- entering a design criteria prior to said extracting of said linear model.

49. The method of claim 42 further comprising:
- applying a design tool to said linear model; and
- designing said at least one of said plurality of controllers and at least one of a performance constraint on a signal and a design specification on dynamics of said control system, said performance constraint and design specification being transformed to be used directly in said design tool.

50. The method of claim 42 further comprising:
- specifying one of a performance constraint for a signal relating to said plurality of controllers and a design specification for dynamics of said control system; and
- operating automatically on said linear model to produce a result.

51. The method of claim 27, further comprising:
- uploading said tuned linear model to said non-linear block diagram model.

* * * * *

UNITED STATES PATENT AND TRADEMARK OFFICE
CERTIFICATE OF CORRECTION

PATENT NO. : 7,890,310 B2
APPLICATION NO. : 10/991899
DATED : February 15, 2011
INVENTOR(S) : John Glass et al.

Page 1 of 1

It is certified that error appears in the above-identified patent and that said Letters Patent is hereby corrected as shown below:

On the title page column 2, line 5,
Under References Cited, Other Publications, please delete "RDM, " First Order System: Linearizing System" and replace with -- RDM, "First Order System: Linearizing System -- and delete the space between 2000, and http.

Page 2, column 1, line 1,
Under References Cited, Other Publications, please delete "The Math Works Inc., "Control Systems Toolbox, For Use with Mathlab," and replace with -- The Math Works Inc. "Control Systems Toolbox, For Use with Matlab, --

Page 2, column 1, line 3,
Under References Cited, Other Publications, please delete "Kajiwara, Hiroyuki, "Progress of CACSD Tools," Journal of Socity" and replace with -- Kajiwara, Hiroyuki, "Progress of CACSD Tools," Journal of Society --

Signed and Sealed this
Thirty-first Day of May, 2011

David J. Kappos
*Director of the United States Patent and Trademark Office*